(12) United States Patent
Karim et al.

(10) Patent No.: US 6,380,862 B1
(45) Date of Patent: Apr. 30, 2002

(54) ELECTRICAL DISTRIBUTION PANEL EMPLOYING A SURGE PROTECTOR

(75) Inventors: Syed M. Karim, Lincoln, IL (US); Peter D. Bauer, Wexford, PA (US)

(73) Assignee: Eaton Corporation, Cleveland, OH (US)

( * ) Notice: Subject to any disclaimer, the term of this patent is extended or adjusted under 35 U.S.C. 154(b) by 4 days.

(21) Appl. No.: 09/687,494

(22) Filed: Oct. 13, 2000

(51) Int. Cl.[7] .............................................. G08B 21/00
(52) U.S. Cl. ...................... 340/635; 349/638; 349/659; 361/118; 361/652
(58) Field of Search ................................ 349/635, 638, 349/639, 657, 659; 361/118, 641, 644, 652

(56) References Cited

U.S. PATENT DOCUMENTS

| | | | |
|---|---|---|---|
| 4,642,733 A | * | 2/1987 | Schacht ...................... 361/656 |
| 5,053,919 A | | 10/1991 | Schacht |
| 5,136,460 A | | 8/1992 | Misencik et al. |
| 5,204,800 A | | 4/1993 | Wasney |
| 5,280,132 A | | 1/1994 | Clarey et al. |
| 5,303,116 A | | 4/1994 | Grotz |
| 5,337,211 A | | 8/1994 | Reiner et al. |
| 5,412,526 A | | 5/1995 | Kapp et al. |
| 5,627,720 A | | 5/1997 | Lewis |
| 5,861,683 A | | 1/1999 | Engel et al. |
| 6,034,611 A | | 3/2000 | Brooks et al. |

* cited by examiner

*Primary Examiner*—Edward Lefkowitz
(74) *Attorney, Agent, or Firm*—Martin J. Moran

(57) ABSTRACT

An electrical distribution panel, such as a residential loadcenter, houses a plurality of circuit breakers that are adapted for electrically interconnecting power lines with loads. The loadcenter includes an enclosure having a window and a plurality of openings, and inputs adapted for electrical connection to power lines. A circuit breaker mounting mechanism houses a plurality of the circuit breakers in association with corresponding ones of the openings of the enclosure. A surge protector device is mounted within the enclosure and is apart from the mounting mechanism. The surge protector device is electrically interconnected with the inputs for protecting the loads from surges or transients on the power lines. The surge protector device includes at least one indicator, which is visible through the window of the enclosure.

20 Claims, 3 Drawing Sheets

ELECTRICAL DISTRIBUTION PANEL EMPLOYING A SURGE PROTECTOR

BACKGROUND OF THE INVENTION

1. Field of the Invention

This invention relates generally to apparatus employing a surge protector and, more particularly, to an electrical distribution panel, such as a residential loadcenter, including a surge protector device.

2. Background Information

Loadcenters are electrical distribution devices used in residential, industrial and commercial applications. Electrical distribution loadcenters typically comprise a wall mounted box enclosure. Within the enclosure is mounted an interior panel which supports conductive bus bars and electric circuit breakers attached to the interior and to the bus bars. A dead front cover is disposed over the box with openings for the circuit breaker handles to project therethrough. A door is hinged to the enclosure over the dead front to conceal the circuit breaker handles. Examples of loadcenters are disclosed in U.S. Pat. Nos. 5,280,132; and 5,337,211.

Loadcenter enclosure boxes may be provided in various lengths according to the number of circuits to be provided therein. Therefore, each loadcenter having a different capacity employs its own enclosure box, or, alternatively, a single enclosure box large enough to accommodate a wide range of circuit capacities may be used.

A loadcenter may be used as service entrance equipment, in which case the enclosure becomes a part of an electrically grounded system, or it may be used as a sub-fed device (i.e., in a multiple unit dwelling) wherein the box is not required to be a part of the electrical grounding system.

U.S. Pat. No. 5,053,919 discloses adding "plug in" surge protective devices in loadcenters, in which a circuit breaker is combined with a surge protector.

U.S. Pat. No. 5,136,460 discloses a whole house surge protector unit in an insulating housing external to a loadcenter for protection of a plurality of circuit branches.

U.S. Pat. No. 5,204,800 discloses a voltage or power surge suppression device having a circuit breaker/interrupter format or a format which is interfaceable with power panels or panelboards. The device includes normal and/or failed indication diagnostics, such as a light emitting diode (LED) and/or audible means. The LED is visible through an opening in a top wall of the isolation device in one of the circuit breaker positions.

U.S. Pat. No. 5,303,116 discloses a surge protector for AC power lines having components mounted on a circuit board.

U.S. Pat. No. 5,627,720 discloses a three-phase power distribution box including built in surge suppression capabilities. A socket is designed to accept a surge suppression module that can be removed and replaced while the electrical connections are hot.

U.S. Pat. No. 6,034,611 discloses a panelboard suitable for residential, commercial or industrial uses. The panelboard includes a dual-pole isolation device for electrically isolating arcing faults. The isolation device includes "plug-in" surge protection circuitry (see U.S. Pat. No. 5,412,526) to protect two distribution buses from voltage surges. The surge protection circuitry includes a light emitting diode (LED) within the enclosure which emits a signal to indicate that the surge protection circuitry is operational. Otherwise, when the LED is extinguished entirely, replacement of the surge protection circuitry is indicated.

Copending, commonly assigned U.S. patent application Ser. No. 09/536,330 discloses a surge protected electrical power distribution system in which the first ends of electrical power buses of a surge protector unit are secured to corresponding buses of a main disconnect unit, and the second ends of the surge protector unit's buses are connected to buses of a multiple meter unit.

Copending, commonly assigned U.S. patent application Ser. No. 09/504,992 discloses a commercial or industrial panelboard including an enclosure that houses circuit breakers for electrical connection between a plurality of power lines and a plurality of loads. A second external enclosure is provided for a surge protection device. Wires or suitable conductors are provided to electrically connect power line legs and neutral (and/or ground) from the panelboard to the surge protection device. Alternatively, the second enclosure may be housed within the first enclosure.

Many manufacturers market surge protection devices for residential users. Various known devices and arrangements protect loads from surges in power supply voltage. Generally, both series and parallel protection are employed. Typically, if surge protection is desired, then customers (e.g., individuals; owners of buildings having multiple tenants, such as offices or apartments) purchase separate surge protection devices and wire those surge protection devices into the electrical power distribution system themselves. Alternatively, individuals may employ surge protection devices (e.g., outlet plug-ins; strips) at selected power outlets.

There is room for improvement in electrical distribution panels and surge protection therefor.

SUMMARY OF THE INVENTION

This and other needs are met by the present invention in which an electrical distribution panel comprises an enclosure having a window and at least one opening associated with at least one electrical switching device; and a surge protector device including at least one indicator, which is visible through the window of the enclosure. In this manner, a user may readily observe the health of the surge protector device, without employing an electrical switching device opening of the enclosure for the surge protector device. Alternatively, one or more electrical switching devices may be dedicated to provide short circuit protection for the surge protector device.

As one aspect of the invention, an electrical distribution panel houses at least one electrical switching device each of which is adapted for electrically interconnecting at least one power line with at least one load. The electrical distribution panel comprises: an enclosure including a window and at least one opening; at least one input adapted for electrical connection to the at least one power line; means for housing at least one electrical switching device in association with a corresponding at least one of the at least one opening of the enclosure; and a surge protector device electrically interconnected with the at least one input for protecting the at least one load from surges or transients on the at least one power line, the surge protector device including at least one indicator which is visible through the window of the enclosure.

Preferably, the surge protector device includes an enunciator for indicating a status condition of the surge protector device. The enunciator may include an audible alarm for enunciating an occurrence of a surge or transient event on the at least one power line. The enunciator may include a circuit breaker electrically connected to one of the inputs for electrical connection to one of the power lines for supplying power to the enunciator.

As another refinement, the at least one power line includes a first power line leg and a second power line leg, and the surge protector device includes a first input for the first power line leg and a second input for the second power line leg. The surge protector device may include a two-pole circuit breaker having a first pole and a second pole, with the first input of the surge protector device including the first pole and the second input of the surge protector device including the second pole, and with the first and second poles being electrically interconnected with the first and second power line legs, respectively.

Preferably, the enclosure includes a door, which selectively covers the window and the at least one opening of the enclosure.

As another aspect of the invention, a residential loadcenter houses a plurality of circuit breakers each of which is adapted for electrically interconnecting at least one power line with at least one load. The loadcenter comprises: an enclosure including a window and a plurality of openings; at least one input adapted for electrical connection to the at least one power line; means for housing a plurality of the circuit breakers in association with corresponding ones of the openings of the enclosure; and a surge protector device mounted within the enclosure and apart from the means for housing, with the surge protector device electrically interconnected with the at least one input for protecting the loads from surges or transients on the at least one power line, the surge protector device including at least one indicator which is visible through the window of the enclosure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "surge" shall expressly include, but not be limited to, a sub-cycle disturbance in an alternating current waveform that includes a high frequency event or a sharp discontinuity of the waveform.

As employed herein, the term "transient" shall expressly include, but not be limited to, surges, spikes, or other abnormal voltage impulses.

As employed herein, the term "electrical distribution panel" includes loadcenters, panelboards, and other indoor or outdoor panels for distributing electrical power to one or more loads.

Figure 1:
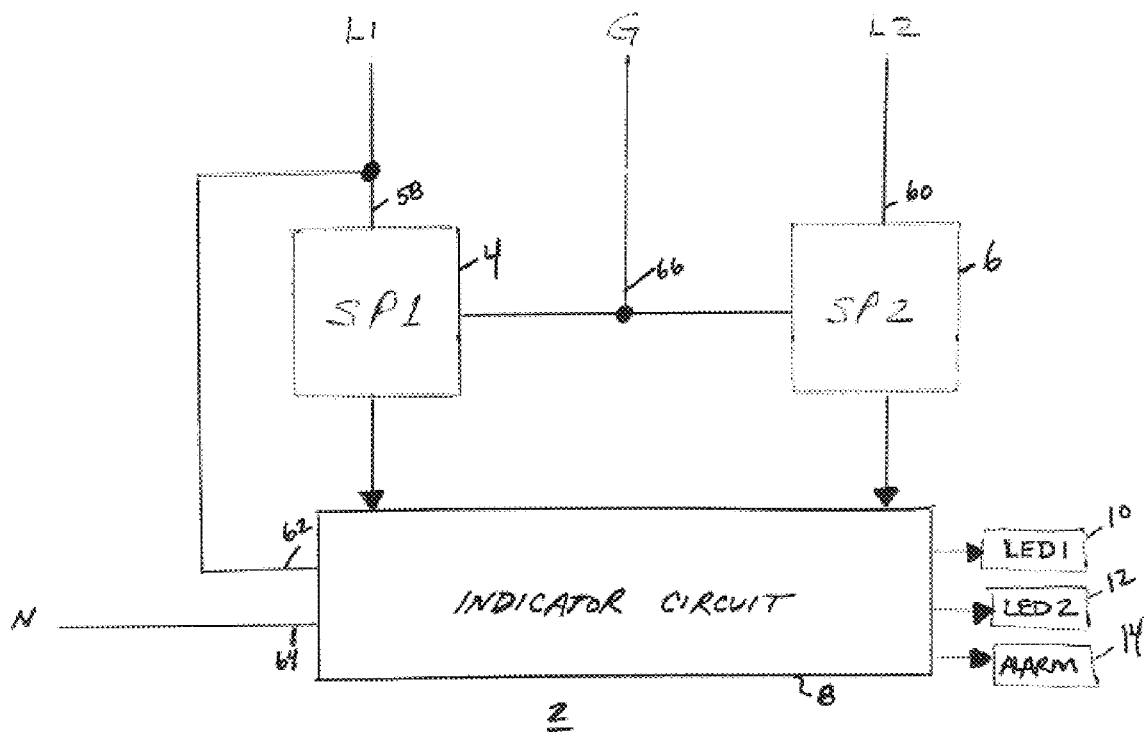
FIG. 1 is a block diagram of a surge protector device in accordance with the present invention.
Figure 2:
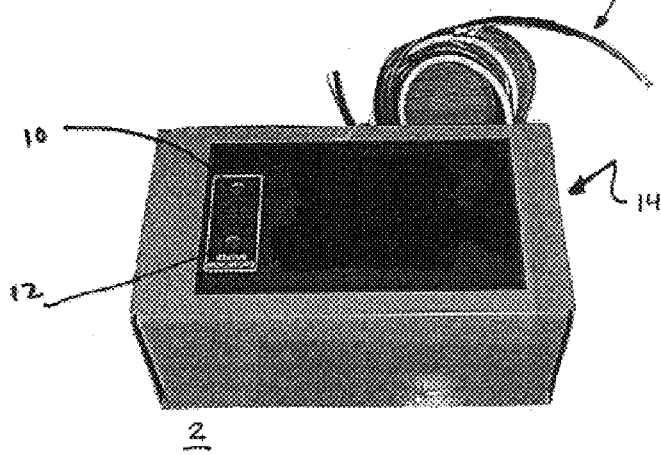
FIG. 2 is an isometric view of the surge protector device of FIG. 1.

Referring to FIGS. 1 and 2, a surge protector device 2 for electrical connection to one or more power line legs L1,L2 is illustrated. The exemplary surge protector device 2 includes surge protectors 4 (SP 1) and 6 (SP2) for electrical connection to the power line legs L1 and L2, respectively. The surge protectors 4,6 protect downstream loads (not shown) from surges or transients between the power line legs L1,L2 and ground G.

Although parallel protection (e.g., in the form of a metal oxide varistor (MOV)) is provided in the exemplary embodiment, a wide range of surge and/or transient protection may be employed such as other forms of parallel protection (e.g. other voltage clamping devices such as zener diodes; crowbar devices such as gas discharge tubes, thyristors, silicon controlled rectifiers (SCRs), TRIACs) in which the surge current is diverted with a low impedance shunt, or series protection in which a high impedance is used in series with the load during a surge to block or limit surge current.

The exemplary surge protector device 2 includes an indicator circuit 8, which indicates a status condition of the device 2. The exemplary circuit 8 drives two visual indicators, such as light emitting diodes (LEDs) 10 (LED1) and 12 (LED2), and an audible alarm 14. The exemplary LEDs 10,12, when illuminated (e.g., a green light), indicate proper operation of the surge protector device 2. On the other hand, when the LEDs 10,12 are extinguished, then improper or failed operation of the surge protector device 2 is indicated and, thus, one or both of the surge protectors 4,6 should be replaced. Preferably, the LEDs 10,12 correspond to the respective surge protectors 4,6, in order to indicate the status of both of those surge protectors. Alternatively, redundant LEDs may be provided, such that if one LED fails, then proper operation of the surge protector device 2 may still be indicated by the functional LED.

The surge protector device 2 also includes an enunciator, such as the exemplary audible alarm 14 for enunciating an occurrence of a surge or transient event on the power line legs L1,L2. In this manner, a user, upon hearing the audible alarm, may verify proper operation of the surge protector device 2 by viewing the state of the LEDs 10,12. As shown in FIG. 1, the indicator circuit 8 receives power from one of the power line legs (e.g., L1) and a neutral line N.

Figure 3:
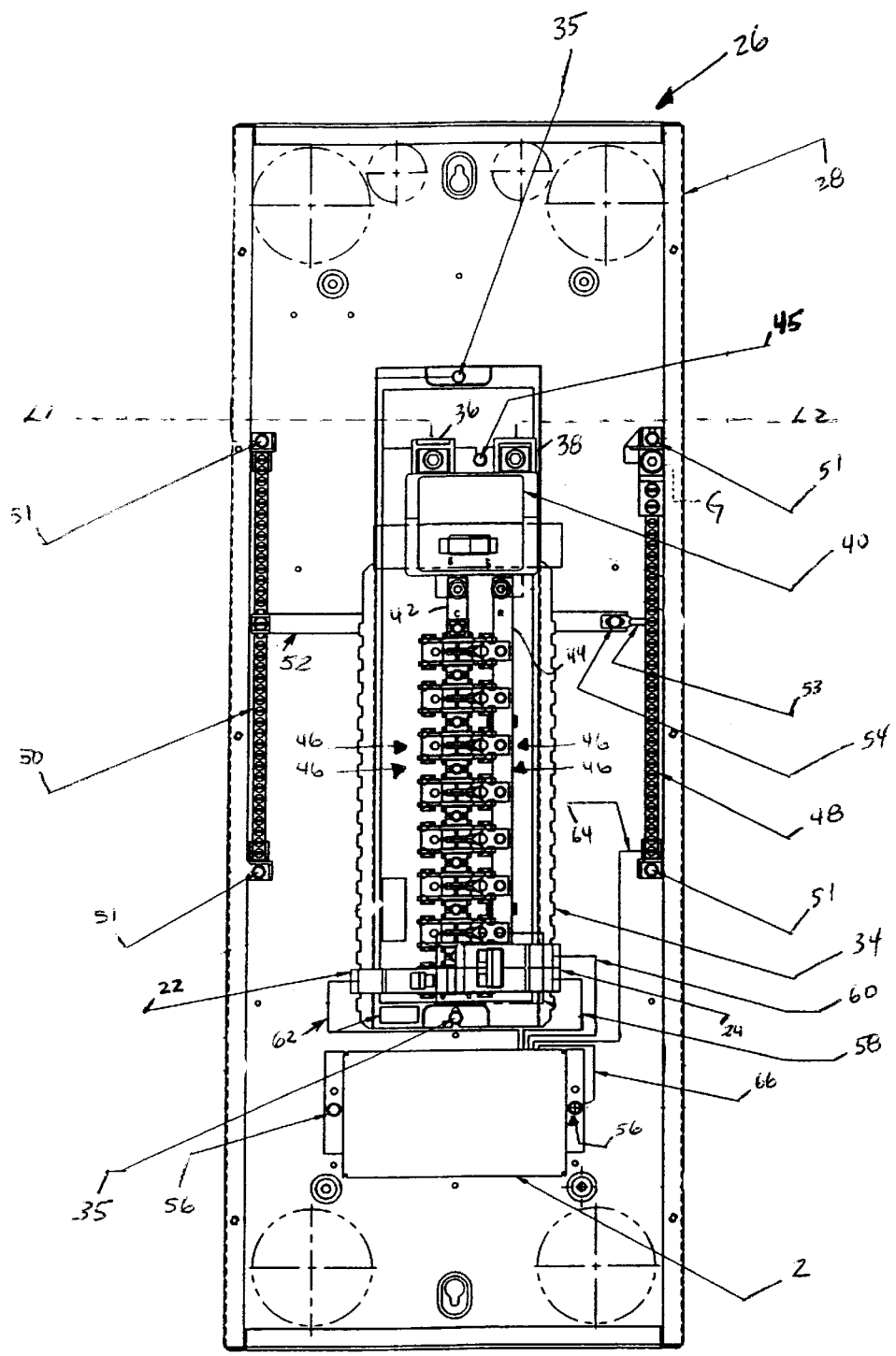
FIG. 3 is a front view of a residential loadcenter, without a front cover, including the surge protector device of FIG. 1 in accordance with the present invention.

FIG. 3 shows a residential loadcenter 20 including the surge protector device 2 of FIG. 1. The exemplary loadcenter 20 is for electrical connection between one or more power line legs, such as L1 and L2, and a plurality of loads (not shown), such as residential loads. Examples of loadcenters for at least one power line and a plurality of loads are disclosed in U.S. Pat. Nos. 5,280,132; and 5,337,211, which are incorporated by reference herein.

The loadcenter 20 houses a plurality of electrical switching devices, such as the exemplary circuit interrupters or circuit breakers 22,24 (FIG. 3) or 78,80 (FIG. 4), each of which is adapted for electrically interconnecting one or both of the power line legs L1,L2 with one or two (or more) loads. The loadcenter 20 includes an enclosure 26 having a base 28, a front cover 30 (shown in FIG. 4), and a door 32 (shown in FIG. 4). The loadcenter 20 also includes a conventional interior assembly 34 for a plurality of power circuits (e.g., without limitation, 32 circuits, 42 circuits). The assembly 34 is suitably secured to the base 28 by fasteners 35.

The assembly 34 includes one or two conventional input terminals 36,38 adapted for electrical connection to the power line legs L1,L2, respectively, a two-pole circuit breaker 40 (e.g., without limitation, 150 A, 200 A) having one pole electrically connected on one side to the input terminal 36 and on the other side to the internal power bus 42, and another pole electrically connected on one side to the input terminal 38 and on the other side to the internal power bus 44. A housing for the input terminals 36,38 is suitably secured to the base 28 of the assembly 34 by a fastener 45.

The assembly 34 also includes a plurality of conventional mechanisms (e.g., without limitation, connector terminals for engaging circuit breaker contact terminals) 46 for housing electrical switching devices, such as the exemplary circuit breakers 22,24.

The exemplary loadcenter 20 further includes conventional neutral assemblies 48,50 having terminations for each of the power circuits. The assemblies 48,50 are suitably secured to the base 28 by fasteners 51. A conventional bonding strap 52 is electrically connected at one end to a termination of the neutral assembly 50 and at the other end to one end of a jumper 53 by a suitable fastener 54, which is also electrically connected to the base 28. In turn, the other end of the jumper 53 is electrically connected to a termination of the neutral assembly 48. Other terminations of the neutral assembly 48 are adapted for electrical connection to the ground G associated with the power line legs L1,L2.

The surge protector device 2, which in the exemplary embodiment is a CHSP-ULTRA surge protector marketed by Cutler-Hammer, a subsidiary of the assignee of the present invention, is suitably secured to the base 28 by fasteners 56. In the exemplary embodiment, the single pole circuit breaker 22 (e.g., without limitation, 15A) and the two-pole circuit breaker 24 (e.g., without limitation, 15A) are operatively associated with the surge protector device 2. With reference to FIGS. 1–3, the five exemplary electrical connections to the surge protector device 2 are provided by suitable electrical connections (e.g., wires, other suitable conductors) 58,60,62,64,66. The wire 58 electrically connects the first pole (L1) of the two-pole circuit breaker 24 to the first surge protector (SP1) 4, and the wire 60 electrically connects the second pole (L2) of the two-pole circuit breaker 24 to the second surge protector (SP2) 6. Power for the indicator circuit 8, including the LEDs 10,12 and the alarm 14, is provided by the wires 62,64, which respectively electrically connect the single pole (L1) circuit breaker 22 and a termination of the neutral assembly 48 to the indicator circuit 8, in order to provide power thereto. The ground for the surge protectors 4,6 is provided by the wire 66, which is electrically connected to the base 28 by the fastener 56. In the exemplary embodiment, the active state of the alarm 14 is set inactive by opening and closing circuit breaker 22.

The exemplary surge protector device 2 is mounted within the enclosure 26 and apart from the circuit breaker housing mechanisms 46. The device 2 is electrically interconnected by the wires 58,60 and 66 with the power line legs L1,L2 and the ground G for protecting the loads of the loadcenter 2 from surges or transients on those power lines. The single pole circuit breaker 22 is electrically connected to the input terminal 36 for electrical connection to the power line leg L1 to supply power to the indicator circuit 8, including the visual indicator LEDs 10,12 and the audible alarm enunciator 14.

Figure 4:
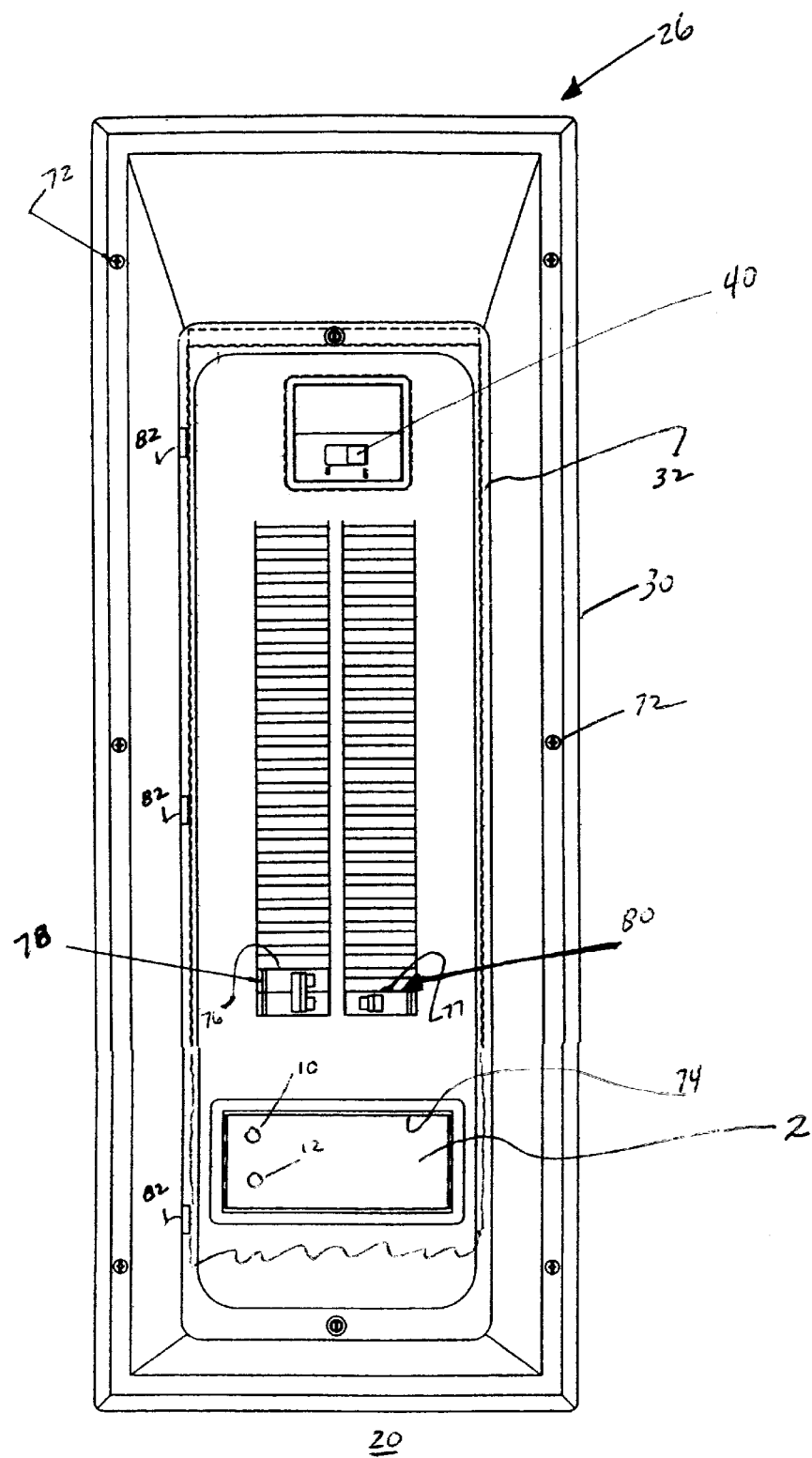
FIG. 4 is a front view of the residential loadcenter of FIG. 3 including the front cover thereof.

FIG. 4 shows the front view of the residential loadcenter 20 of FIG. 3 including the front cover 30 thereof. The front cover 30 is suitably secured to the base 28 of FIG. 3 by fasteners 72. The front cover 30 of the enclosure 26 includes a window 74 for the surge protector device 2 and a plurality of openings 76,77 for the respective circuit breakers (CBs), such as CBs 78,80. The front cover 30 also includes a door 32, which is hingedly mounted thereto by hinges 82, and which selectively covers the window 74 and the openings 76,77 of the enclosure 26. The circuit breakers 78,80 are disposed in the enclosure 26 in association with corresponding ones of the openings 76,77. The surge protector device 2 includes the LED indicators 10,12, which are visible through the window 74 of the enclosure 26.

The exemplary loadcenter 20 employs the surge protector device 2, which is factory installed and properly sized for the full range of circuit breakers that may be installed therein. In this manner, a wide variety of loads powered through the loadcenter 20 are effectively protected from surges or transients on the power line legs L1,L2. Hence, user loads and powered electrical equipment are suitably protected. Furthermore, the combination of the visible LEDs 10,12 and the audible alarm 14 permit the user to readily determine the occurrence of a surge event and whether the surge protectors 4,6 are functional after that event. Moreover, user safety is enhanced, since that determination may be made and the LEDs 10,12 may be viewed without requiring access to the powered internal structure of the loadcenter 20. Although the exemplary embodiment employs circuit breakers 24 and 22 to protect from faults in the surge protectors 4,6 and the indicator circuit 8, respectively, the invention is applicable to surge protector devices (not shown) which may or may not incorporate circuit interrupters (e.g., circuit breakers, fuses) therein or therewith, thereby providing additional slots in the loadcenter for circuit breakers for conventional loads.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electrical distribution panel for housing at least one electrical switching device each of which is adapted for electrically interconnecting at least one power line with at least one load, said electrical distribution panel comprising:

an enclosure including a window and at least one opening;

at least one input adapted for electrical connection to said at least one power line;

means for housing at least one electrical switching device in association with a corresponding at least one of the at least one opening of said enclosure; and a surge protector device electrically interconnected with said at least one input for protecting said at least one load from surges or transients on said at least one power line, said surge protector device including at least one indicator which is visible through the window of said enclosure.

2. The electrical distribution panel as recited in claim 1, wherein said at least one indicator indicates a status condition of said surge protector device.

3. The electrical distribution panel as recited in claim 2, wherein said at least one indicator includes an indicator for indicating proper operation of said surge protector device.

4. The electrical distribution panel as recited in claim 2, wherein said at least one indicator includes two indicators for indicating proper operation of said surge protector device.

5. The electrical distribution panel as recited in claim 2, wherein said at least one indicator includes an indicator which is extinguished for improper or failed operation of said surge protector device.

6. The electrical distribution panel as recited in claim 2, wherein said at least one indicator includes a visual indicator which is illuminated for proper operation of said surge protector device and which is extinguished for improper or failed operation of said surge protector device.

7. The electrical distribution panel as recited in claim 1, wherein said surge protector device includes an enunciator for indicating a status condition of said surge protector device.

8. The electrical distribution panel as recited in claim 7, wherein said enunciator includes an audible alarm for enunciating an occurrence of a surge or transient event on said at least one power line.

9. The electrical distribution panel as recited in claim 7, wherein said at least one input includes a plurality of inputs; wherein said at least one power line includes a plurality of power lines; and wherein said enunciator includes a circuit breaker electrically connected to one of said inputs for electrical connection to one of said power lines for supplying power to said enunciator.

10. The electrical distribution panel as recited in claim 1, wherein said at least one power line includes a first power line leg and a second power line leg; and wherein said surge protector device includes a first input for said first power line leg and a second input for said second power line leg.

11. The electrical distribution panel as recited in claim 10, wherein said surge protector device includes a two-pole circuit breaker having a first pole and a second pole; wherein the first input of said surge protector device includes said first pole and the second input of said surge protector device includes said second pole, with said first and second poles being electrically interconnected with said first and second power line legs, respectively.

12. The electrical distribution panel as recited in claim 1, wherein said electrical distribution panel is a residential loadcenter.

13. The electrical distribution panel as recited in claim 1, wherein said at least one electrical switching device is a plurality of circuit breakers.

14. The electrical distribution panel as recited in claim 1, wherein said at least one electrical switching device is a plurality of circuit interrupters.

15. The electrical distribution panel as recited in claim 1, wherein said enclosure includes a door, which selectively covers the window and the at least one opening of said enclosure.

16. A residential loadcenter for housing a plurality of circuit breakers each of which is adapted for electrically interconnecting at least one power line with at least one load, said loadcenter comprising:
    an enclosure including a window and a plurality of openings;
    at least one input adapted for electrical connection to said at least one power line;
    means for housing a plurality of said circuit breakers in association with corresponding ones of the openings of said enclosure; and
    a surge protector device mounted within said enclosure and apart from said means for housing, said surge protector device electrically interconnected with said at least one input for protecting said loads from surges or transients on said at least one power line, said surge protector device including at least one indicator which is visible through the window of said enclosure.

17. The residential loadcenter as recited in claim 16, wherein said at least one indicator indicates proper operation of said surge protector device.

18. The residential loadcenter as recited in claim 17, wherein said surge protector device includes an audible alarm for enunciating an occurrence of a surge or transient event on said at least one power line.

19. The residential loadcenter as recited in claim 16, wherein said at least one power line includes a first power line leg and a second power line leg; wherein said surge protector device includes a first input for said first power line leg, a second input for said second power line leg, and a two-pole circuit breaker having a first pole and a second pole, with the first input of said surge protector device including said first pole and the second input of said surge protector device including said second pole, and with said first and second poles being electrically interconnected with said first and second power line legs, respectively.

20. The residential loadcenter as recited in claim 16, wherein said enclosure includes a door, which selectively covers the window and the openings of said enclosure.

* * * * *